Oct. 1, 1935. J. H. SCHMIDT 2,016,180
ARTIFICIAL RESIN COMPOSITION
Filed April 15, 1932
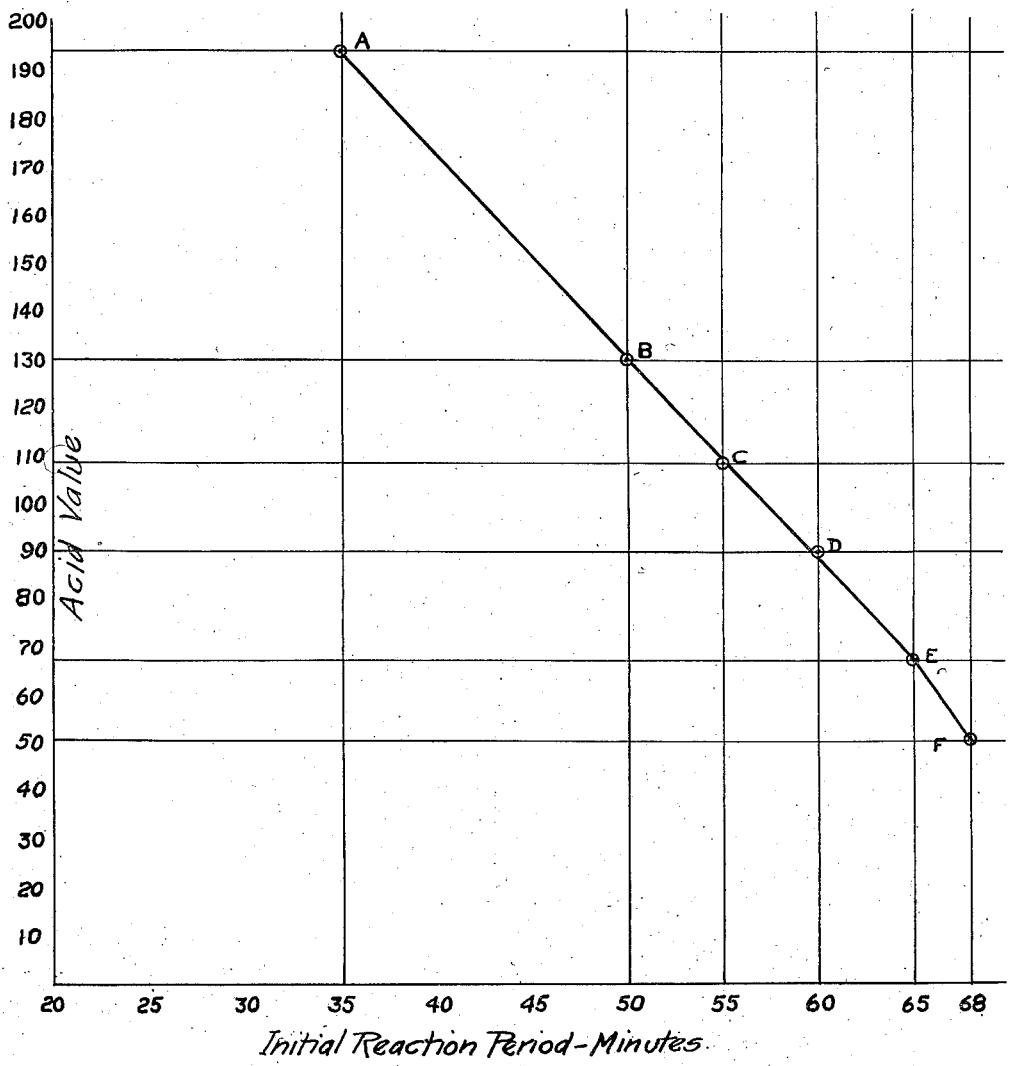
INVENTOR.
John H. Schmidt
BY
ATTORNEYS.

Patented Oct. 1, 1935

2,016,180

UNITED STATES PATENT OFFICE 2,016,180

ARTIFICIAL RESIN COMPOSITION

John H. Schmidt, Bloomfield, N. J.

Application April 15, 1932, Serial No. 605,439

11 Claims. (Cl. 134—26)

This invention relates to compositions suitable for varnish, lacquers, enamels, and other uses. It comprises a novel composition which furnishes a coating which may be colorless, white or of any desired color, is non-darkening and capable of withstanding temperatures up to 200° C. or higher. The base of the composition is a resin of the glycerol-phthalic anhydride type. My invention includes the method of preparing the composition, which method in a preferred form is hereafter described, it being understood that the invention is not restricted to the particular conditions therein set forth.

Resins are in general prepared from glycerol and phthalic anhydride by heating about one part by weight glycerol with two parts by weight of phthalic anhydride. After a preliminary heating to about 140° C. the reaction mass gradually rises in temperature until at about 235° C. there is a sudden transformation of the mass into a substantially infusible porous solid slag. It has been proposed to avoid the formation of the porous slag by stopping the initial reaction at a stage where samples solidify upon cooling to room temperatures; and for lacquer or varnish purposes it has been proposed to dissolve the resin obtained at this arrested stage. A film deposited from such a solution, however, lacks durability, toughness, resistance to moisture, etc. as well as being fusible. Baking of the film improves it with regard to these properties but the baking period required for a thin film is very prolonged (at least 20 hours) and during this period a gradual darkening to a decided yellow or brown occurs which makes it unsuitable for most purposes. Moreover when the film is materially more than one-tenth of an inch in thickness, hardening of the surface takes place, but the substance below the surface remains soft even though the baking be extended for days. When the resin is baked in thicknesses of a half-inch or more the period required for hardening of the interior is further increased to weeks or months.

After extended experiments I have discovered that a relationship exists between the initial resin-forming reaction and the hardenable and other properties of resin of this character and films made therefrom. If the initial reaction be continued materially beyond the point where a simple solidifies upon cooling to room temperature, and preferably as close to the slag-forming stage as is practically possible, it is found that a profound change is effected as to the heat-hardening properties and also as to the character of the product so obtained. Not only is the time of after-baking cut down out of all proportion to the time applied for the continuation of the initial reaction, but the resin itself is found to have changed properties, and films deposited from solutions can be obtained which do not change color upon heating and whose hardening is not restricted to the surface.

In my analyses of resins of the glycerol-phthalic anhydride type I have noted that a decrease in acidity as expressed by acid values takes place during a continuation of the initial reaction and that this decrease is commensurate with the changes occurring in the resin properties. This perhaps can best be explained by reference to the accompanying drawing in which the figure shows a graph wherein the abscissa indicates the reaction period and the ordinate the acid values as found from solutions of the resin in alcohol.

The point marked A on the graph indicates a resin prepared from 300 grams of glycerol and 600 grams of phthalic anhydride and reacted for a period of 15 minutes to a temperature of about 200° C. after a preliminary heating of 20 minutes. The period of time required depends upon the size of the batch, heat radiation, etc.; but with a batch of the size described and radiation prevented by the use of guards, a temperature of about 200° C. is reached in a period of 15 minutes. The resulting resin was a solid when cooled. A sample of the resin was dissolved in alcohol and its acid value determined which was found to be 195. The same conditions were observed in connection with the resin indicated by point B of the graph but the initial reaction was continued for another 15 minutes to about 215° C.; the resin which was hard and brittle when cold showed an acid value of 131. For the next experiment, point C of the graph, the reaction was continued for an additional 5 minutes with a final temperature of about 220° C.; the acid value was reduced to 110. Point D of the graph indicates a resin whose initial reaction was continued another 5 minutes to about 225° C.; the acid value was found to be 88.5. The resin indicated by point E was one whose initial reaction was extended another 5 minutes or 65 minutes in all, reaching a temperature of about 230° C.; this showed an acid value of 67.8. The final point F is that of a resin continued for another three minutes, and this resin was so close to the point of becoming an infusible slag in the flask that it solidified while being poured even though the temperature was reduced somewhat by removing the guards; it showed an acid value of 51.8.

Upon examination of the graph it will be noted that it is a straight line until it approaches the solidification or slag-forming stage. At about the point E, however, a break occurs which is suggestive of a change in the nature or structure of the resin; this is further indicated by an increased viscosity of the mass, decreased solubility and the tendency to string. It is the resin which has been reacted to this state of incipient change, or that corresponding to the point E, that I find is most desirable for the contemplated uses in lacquers and the like.

For the manufacture of lacquers, the resin when it has reacted to the condition desired, is quickly poured into a solvent preferably boiling between 175 and 180° C., and stirred. The reaction is thereby immediately arrested. As such a solvent I prefer to use from 1000 to 2000 grams of diethyl oxalate or glycol diacetate for a batch of the size heretofore described, though other solvents of similar nature such for example as diethyl or dibutyl esters of phthalic, tartaric or similar organic acids can be used. The solution can now be further heated and preferably until a gel is formed. The gel is then dispersed in a medium boiling solvent or liquid proportioned in accordance with the desired consistency of the coating composition. As medium-boiling diluents I have found ethyl lactate, diethyl carbonate and the ethyl ether of ethylene glycol to be well adapted for the purpose, although other diluents of similar characteristics may be used.

The resulting composition may be either used directly as a lacquer or further diluted with low boiling solvents as alcohol, ethyl acetate and the like, or after grinding with white or other pigments as an enamel. Even though the mixture show traces of the gel structure, the film upon drying is homogeneous and continuous. Either directly or after drying the film may be baked.

The time and temperature required to bring the solution in high boiling solvent to the condition of a gel is strikingly illustrated by the resins which have been initially reacted for different lengths of time. The resin corresponding to point B of the graph required heating in diethyl oxalate for three hours and forty minutes, that corresponding to point C, one hour and forty-five minutes, point D one hour, and point E twenty-five minutes; in each case the temperature was maintained around 160° C. It will be noted that as the end or slag formation point of the resin is approached in the initial reaction that the time for forming a gel with the solvent is greatly decreased; an increase in the initial reaction period from sixty to sixty-five minutes lessens the digestion period in the solvent more than 50 per cent. In the first case B the solution became amber in color, in the second case C a straw color, while the last case E showed freedom from any color.

With a lacquer containing the resin in the condition corresponding to that of point E, a baking period of a deposited film for about twenty minutes at 180° or 190° C. will be found to give a color-free film, resistant to moisture and most solvents as alcohol, benzene, and the like.

Instead of glycerol, polyglycerols may be used, and instead of phthalic anhydride or in admixture therewith I may use other organic acids or their anhydrides, as for example succinic, maleic, or malic acids, or their mixtures.

The above described composition can be used likewise for making so-called molding mixtures by incorporating suitable filling materials, pigments, dyes, etc. These mixtures may be submitted to a partial or complete drying before use in molding, or they may be used as such if the amount of solvent is small enough not to be objectionable. The known methods of molding can then be utilized; for instance, joint application of heat and pressure, which may be followed by further heating, or press molding followed by heating under suitable conditions.

In all cases the resulting resin is of the glycerol-phthalic anhydride type.

This application is a continuation-in-part of an earlier application No. 126,933 filed Aug. 3, 1926.

I claim:

1. Liquid composition suitable for use as a lacquer comprising a homogeneous solution of a glycerol-phthalic anhydride type of resin that has been reacted to an acid value of 110 or less in sufficient amount of a high boiling solvent to yield a composition that is fluid when cold.

2. Liquid composition suitable for use as a lacquer comprising a homogeneous solution of a glycerol-phthalic anhydride type of resin that has been reacted to an acid value of 110 or less in sufficient amount of a high boiling solvent to yield a composition that is fluid when cold, and thinned with a medium boiling solvent.

3. Method of making a composition which comprises preparing a resin of the glycerol-phthalic anhydride type and continuing the initial reaction until the acid number is reduced to 110 or less but not to the infusible stage, incorporating a high-boiling solvent with the resin in amount to arrest the resin reaction, heating the solution to advance the resin in the high-boiling solvent, and incorporating a relatively low-boiling solvent to thereby yield a composition suitable for coating and substantially free from color change.

4. Method of making a composition which comprises preparing a resin of the glycerol-phthalic anhydride type and continuing the initial reaction until the acid value is reduced to 110 or less but not to the infusible stage, incorporating a high boiling solvent with the resin in amount to arrest the resin reaction, and heating the solution to advance the resin in the solvent to a state characterized by the formation of a homogeneous continuous film substantially free from color change.

5. Method according to claim 3 in which the initial reaction is continued until the acid value is reduced to about 70.

6. Method according to claim 4 in which the initial reaction is continued until the acid value is reduced to about 70.

7. Composition comprising a resin of the glycerol-phthalic anhydride type having an initial acid value of 110 or less in solution with a high boiling solvent and advanced in said solvent to a state characterized by the formation of a homogeneous continuous film substantially free from color change.

8. Composition according to claim 7 including a diluent of lower boiling point than the solvent.

9. Composition according to claim 7 in which the resin has an initial acid value of about 70.

10. Composition according to claim 7 in which the solvent comprises diethyl oxalate.

11. Composition according to claim 7 in which the solvent comprises diethyl oxalate and ethyl lactate.

JOHN H. SCHMIDT.